United States Patent
Devaney

(10) Patent No.: US 10,022,801 B1
(45) Date of Patent: Jul. 17, 2018

(54) PIPE BRACING DEVICE FOR PIPE MACHINING APPARATUS

(71) Applicant: Gregory Devaney, Brandon, SD (US)

(72) Inventor: Gregory Devaney, Brandon, SD (US)

( * ) Notice: Subject to any disclaimer, the term of this patent is extended or adjusted under 35 U.S.C. 154(b) by 275 days.

(21) Appl. No.: 14/955,946

(22) Filed: Dec. 1, 2015

(51) Int. Cl.
  *B27C 7/06* (2006.01)
  *B23B 23/02* (2006.01)
  *B23B 5/08* (2006.01)

(52) U.S. Cl.
  CPC ............. *B23B 23/02* (2013.01); *B23B 5/08* (2013.01); *B23B 2215/72* (2013.01)

(58) Field of Classification Search
  CPC ........... G05B 2219/49112; G05B 2219/49134; G05B 2219/50152; B23Q 7/05; B23Q 7/005; B23Q 7/001; B23Q 7/04
  See application file for complete search history.

(56) References Cited

U.S. PATENT DOCUMENTS

| | | | | |
|---|---|---|---|---|
| 1,780,325 A | | 11/1930 | Williams | |
| 2,004,540 A | * | 6/1935 | Smith | B23Q 7/04 29/51 |
| 2,379,307 A | * | 6/1945 | Lawson | B23B 29/16 407/64 |
| 2,409,772 A | | 10/1946 | Lund | |
| 2,551,517 A | * | 5/1951 | Webb | B23G 1/22 408/10 |
| 2,779,956 A | * | 2/1957 | Butler | B23Q 1/76 29/38 B |
| 3,095,772 A | * | 7/1963 | Ingwer | B23G 1/22 408/66 |
| 3,473,359 A | | 10/1969 | Joslin | |
| 3,546,986 A | * | 12/1970 | Blake | B23B 5/165 82/47 |
| 3,572,199 A | * | 3/1971 | Harden | B23D 45/12 266/57 |
| 3,600,990 A | * | 8/1971 | Renoux | B23Q 7/05 193/38 |
| 3,699,828 A | | 10/1972 | Piatek | |
| 3,833,979 A | * | 9/1974 | Seavey | B21D 43/006 144/48 |
| 3,842,636 A | | 10/1974 | Kozhevnikov | |
| 3,995,466 A | | 12/1976 | Kunsman | |
| 4,063,577 A | * | 12/1977 | Tennant | B27C 7/06 142/49 |
| 4,166,370 A | | 9/1979 | Goodman | |

(Continued)

*Primary Examiner* — Sara Addisu
(74) *Attorney, Agent, or Firm* — Jeffrey A. Proehl; Woods Fuller Shultz & Smith P.C.

(57) ABSTRACT

A bracing device for bracing pipe on a pipe machining apparatus may include a mounting portion configured to mount on a support arm of the pipe machining apparatus and may have a continuous loop to capture a portion of the support arm. The mounting portion may be pivotable and slidable on the support arm. The device may include a support portion configured to engage a pipe and having an abutment surface for abutting against the exterior of the pipe. The support portion may have an open configuration to permit the abutment surface to be moved into contact with a pipe in the pipe machining apparatus when the mounting portion is mounted on the support arm. The device may also include a spacing portion extending between the mounting and support portions to maintain the support portion at a fixed distance from the mounting portion.

20 Claims, 2 Drawing Sheets

(56) References Cited

U.S. PATENT DOCUMENTS

| | | | | |
|---|---|---|---|---|
| 4,295,396 A * | 10/1981 | Hasslauer | B23Q 7/05 82/1.11 |
| 4,418,458 A * | 12/1983 | Hunter | B21D 39/04 29/237 |
| 4,465,422 A * | 8/1984 | Blust, Sr. | B23Q 1/76 408/45 |
| 5,018,563 A * | 5/1991 | Yoder | B25H 1/04 144/1.1 |
| 5,027,681 A * | 7/1991 | Hyvarinen | B23D 45/046 30/94 |
| 5,079,940 A | 1/1992 | Pulver | |
| 5,366,334 A * | 11/1994 | Cucchi | B23B 13/02 414/15 |
| 5,424,846 A * | 6/1995 | Bornhorst, Jr. | B23B 31/1622 358/3.32 |
| 5,441,089 A * | 8/1995 | Lazarou | B23Q 1/4828 142/38 |
| 5,528,919 A * | 6/1996 | McGrady | B21D 17/04 72/105 |
| 5,658,124 A * | 8/1997 | Presnell, III | B66F 3/10 414/11 |
| 5,661,565 A * | 8/1997 | Bornhorst, Jr. | B23B 31/1622 358/3.32 |
| 5,778,715 A * | 7/1998 | Lippka | B21D 17/04 72/106 |
| 5,873,522 A * | 2/1999 | Roberts | A01G 25/09 239/1 |
| 6,988,719 B2 * | 1/2006 | Ursell | B23Q 3/105 248/269 |
| 8,266,991 B2 * | 9/2012 | Thorson | B23D 21/04 30/101 |
| 9,108,259 B1 * | 8/2015 | Hung | B23G 1/08 |
| 2005/0178179 A1 * | 8/2005 | Dole | B21D 17/04 72/106 |
| 2005/0226712 A1 * | 10/2005 | Kirykowicz | B23Q 7/001 414/749.1 |
| 2008/0008549 A1 * | 1/2008 | Schawe | B23G 1/02 409/66 |
| 2015/0090083 A1 * | 4/2015 | Conrad | B23B 5/08 82/47 |

\* cited by examiner

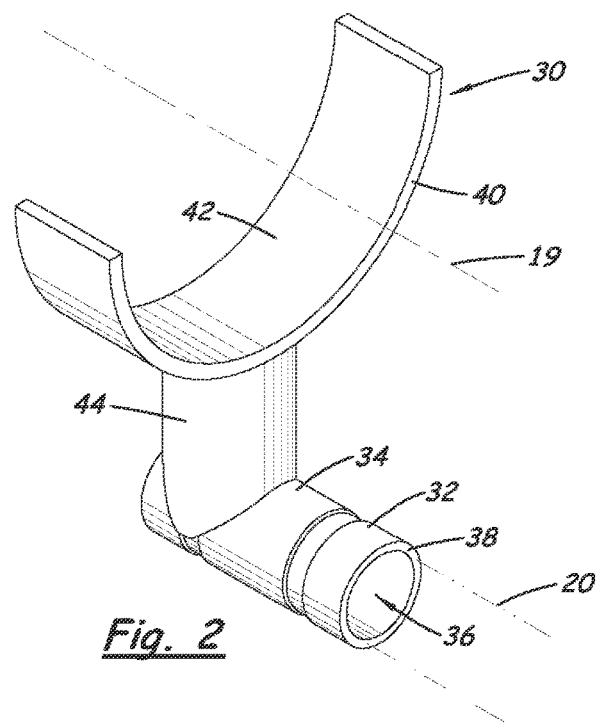
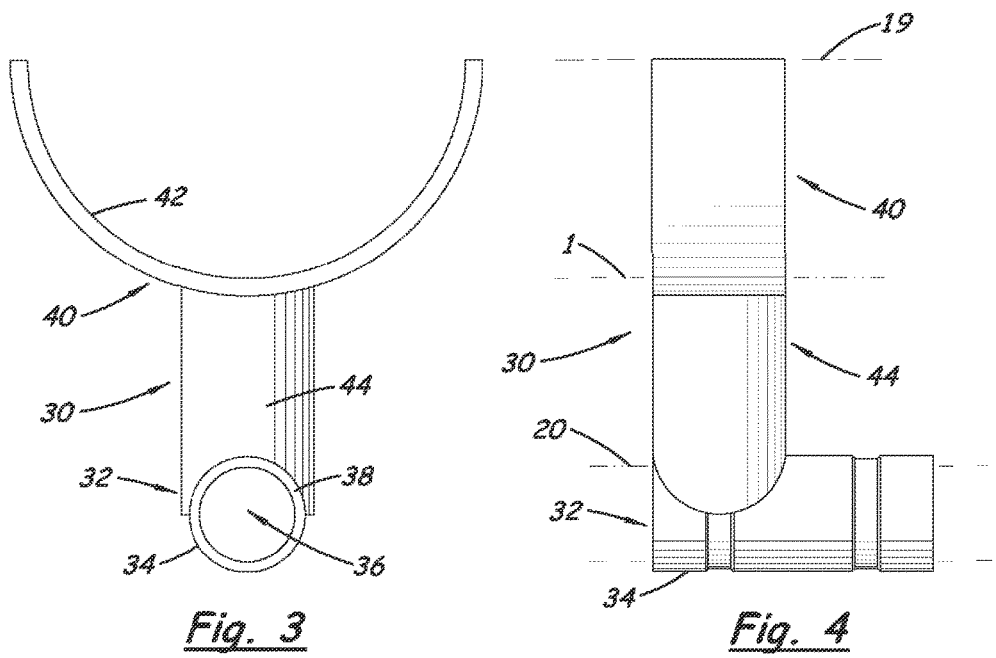

PIPE BRACING DEVICE FOR PIPE MACHINING APPARATUS

BACKGROUND

Field

The present disclosure relates to pipe machining apparatus and more particularly pertains to a new pipe bracing device for pipe machining apparatus to enhance the stability of relatively short pipes on the machining apparatus.

SUMMARY

In one aspect, the present disclosure relates to a bracing device for bracing a length of pipe on a pipe machining apparatus as the pipe is being machined. The bracing device may comprise a mounting portion configured to mount on a support arm of the pipe machining apparatus, with the mounting portion being configured with a continuous loop to capture a portion of the support arm. The loop may have an interior to receive the portion of the support arm, and the mounting portion being pivotable with respect to the support arm when mounted on the support arm. The mounting portion may be slidable along at least a portion of the support arm. The device may comprise a support portion configured to engage a pipe gripped by the pipe machining apparatus, and may have an abutment surface for abutting against the exterior of the pipe. The support portion may have an open configuration to permit the abutment surface to be moved into contact with a pipe in the pipe machining apparatus when the mounting portion is mounted on the support arm. The device may also comprise a spacing portion extending between the mounting portion and the support portion, with the spacing portion being connected to the mounting portion and the support portion to maintain the support portion at a fixed distance from the mounting portion.

In another aspect, the disclosure relates to a system that may comprise a pipe machining apparatus comprising a power drive unit configured to rotate a pipe to be machined. The power drive unit may comprise a housing with a passage for receiving a length of pipe and having a primary end and a secondary end and a longitudinal axis along which a pipe is supportable in the passage. The power drive unit may also comprise at least one support arm mounted on the housing, primary gripping jaws configured to grip the pipe and being rotatably mounted on the housing; and a machining attachment configured to machine a pipe and being mounted on the power drive unit. The system may also comprise a bracing device for bracing a length of pipe on a pipe machining apparatus as the pipe is being machined. The bracing device may comprise a mounting portion mounted on the support arm of the pipe machining apparatus and being configured with a continuous loop to capture a portion of the support arm. The loop may have an interior receiving the portion of the support arm. The device may also comprise a support portion configured to engage a pipe gripped by the pipe machining apparatus, with the support portion having an abutment surface for abutting against the exterior of the pipe. The device may further comprise a spacing portion extending between the mounting portion and the support portion, with the spacing portion being connected to the mounting portion and the support portion to maintain the support portion at a fixed distance from the mounting portion.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of construction and to the arrangements of the components, and the particulars of the steps, set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein:

FIG. 2 is a schematic perspective view of the pipe bracing device, according to an illustrative embodiment.

FIG. 3 is a schematic front view of the pipe bracing device, according to an illustrative embodiment.

FIG. 4 is a schematic side view of the pipe bracing device, according to an illustrative embodiment.

DETAILED DESCRIPTION

Figure 1:
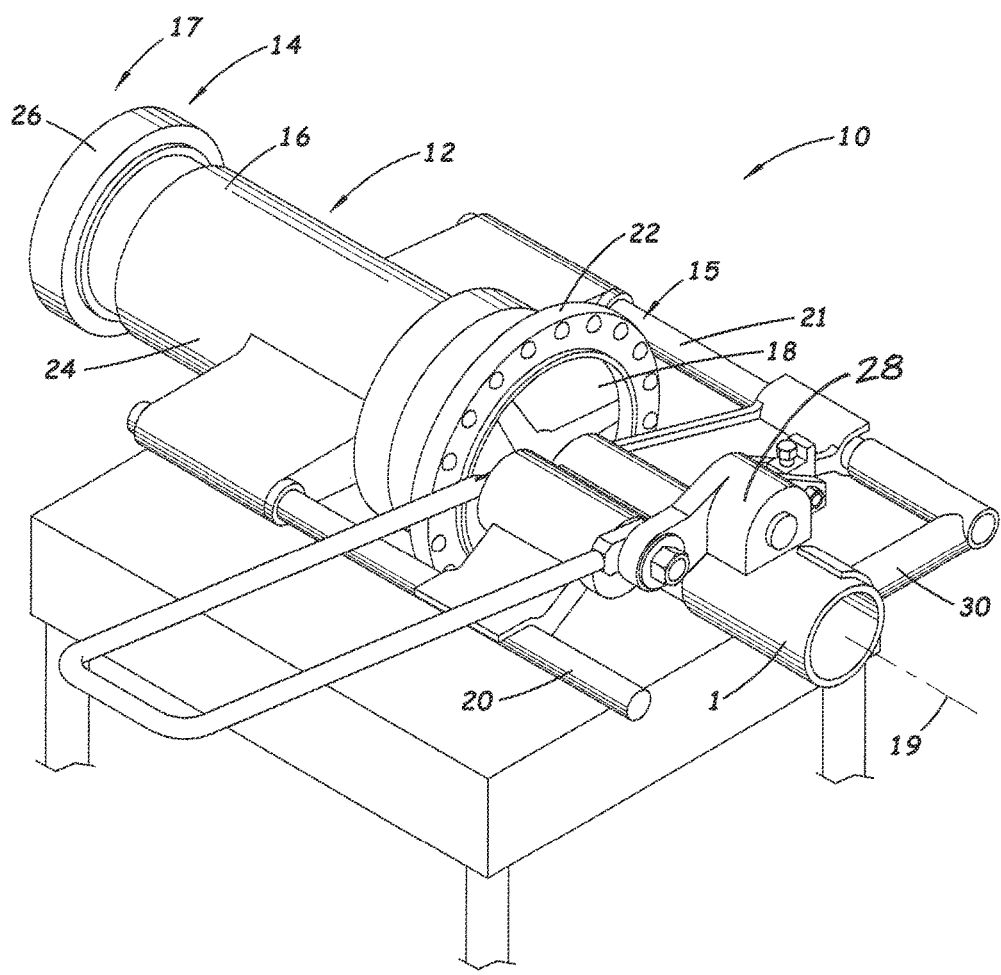
FIG. 1 is a schematic perspective view of a pipe machining apparatus with a new pipe bracing device according to the present disclosure.

With reference now to the drawings, and in particular to FIGS. 1 through 4 thereof, a new pipe bracing device for pipe machining apparatus embodying the principles and concepts of the disclosed subject matter will be described.

Pipe machining apparatus is used for machining a length of pipe, such as cutting, grooving or forming threads on the exterior of the pipe. One such pipe machining apparatus is the RIDGID Model 300, available from Ridgid Tool Company, 400 Clark Street, Elyria, Ohio 44035, although other machining apparatus may be suitable for use with aspects of this disclosure. The machine is highly useful for performing the aforedescribed operations on a length of pipe, but also has some limitations and disadvantages, particularly when forming a groove on the pipe using, for example, the RIDGID Model 916 groover device and the length of the pipe is relatively short. When operating the groover on a relatively short length of pipe, the Model 300 pipe machining apparatus does not grip the length of pipe, and performing the grooving operation can be difficult and in some cases may be dangerous as the grooving rollers apply force to the pipe that can make the pipe difficult to hold by hand and potentially the pipe may be dislodged from a secure mounting on the machine. Other machines may have similar limitations when the length of the pipe is less than a length particular to that machine. As described in this disclosure, applicant has devised an improvement for such pipe machining apparatus that enhances the ability of a pipe having a relatively short length, and in turn provides a safer work environment for the operator as well as minimizing the possibility of the pipe being damaged if the pipe is not securely held.

In some aspects, the disclosure relates to a system 10 that includes a pipe machining apparatus 12 typically utilized for performing various machining operations on a length of pipe, such as cutting off a portion of the pipe, forming a groove in the exterior surface of the pipe, and forming external threads on the exterior surface of the pipe. It should be recognized that other operations may be performed on the pipe by a suitable pipe machining apparatus, although these are the most common operations. The pipe machining apparatus 12 may include a power drive unit 14 which is generally configured to grip or secure and support the pipe, while also being able to rotate the pipe with respect to various machining tools. In the case of the groover device, the apparatus 12 may not actually grip the pipe to be machined, but instead the power drive unit 14 rotates a shaft that drives the rollers of the groover. The power drive unit 14 may be supported by a plurality of legs in an elevated position above a ground or floor surface. The power drive unit 14 may include a housing 16 which may be configured with a passage 18 for receiving a portion of the length of pipe 1. The passage may have a primary end 15 and a secondary end 17 and a longitudinal axis 19 may extend through the passage. A pipe being machined may in some operations be supported in a centered relationship on the axis 19 in the passage through the housing, and rotated on the axis 19. The portion of the pipe being machined is generally located outside of the passage and adjacent to the primary end of the passage. Again, the exemplary Model 916 groover does not permit the pipe to be gripped by the power drive unit.

The power drive unit 14 may include at least one support arm 20 which is mounted on the housing 16 and may extend substantially parallel to the longitudinal axis 19 of the passage. In some embodiments, the support arm 20 extends from a location adjacent to the primary end of the passage outwardly away from the housing. In some embodiments, the at least one support arm 20 includes a pair of support arms 20, 21 and the arms generally extend substantially parallel to each other away from the housing at the primary end 15 of the passage. The support arm or arms may also be mounted on the housing 16 at a level that is vertically lower than the longitudinal axis 19 of the passage, and the arms may be located in a laterally spaced relationship below and outwardly from the longitudinal axis 19. Illustratively, the support arm or arms may have a substantially cylindrical exterior surface.

The power drive unit 14 may include primary gripping jaws 22 which are configured to grip a pipe, or in the case of the groover 916, is configured to grip a shaft used to rotate the rollers of the groover. The primary gripping jaws typically grip the exterior surface of the pipe, or the shaft of the groover, and may be adjustable to adjust to the different outside pipe diameters. The primary gripping jaws 22 may be rotatably mounted on the housing and may be positioned about the passage 18 such that the jaws are substantially equally radially spaced from the longitudinal axis 19. The primary gripping jaws 22 may be positioned generally at the primary end 15 of the passage in the housing. The power drive unit 14 may also include a motor 24 which is mounted on the housing and is configured to rotate the primary gripping jaws 22 with respect to the housing to thereby rotate a pipe which is gripped by the gripping jaws. The primary gripping jaws may thus rotate a pipe extending through the passage with respect to the housing and the support arm (or arms), as well as any tools mounted on the support arm. The primary gripping jaws may also rotate the shaft of the groover to drive the rollers of the groover.

The power drive unit 14 may also include secondary gripping jaws 26 which are configured to grip a pipe that is positioned in the passage 18 of the housing 16. The secondary gripping jaws may be located in a location that is spaced along the longitudinal axis 19 from the primary gripping jaws 22. The secondary gripping jaws may be located at the secondary end 17 of the passage, and may be adjustable to adjust to the outside diameter of the surface of different pipe sizes.

The pipe machinery apparatus 12 may also include a machining attachment 28 which is configured to perform a machining operation (such as forming a groove) on a pipe mounted on the power drive unit 14. The grooving attachment 28 is generally also mounted on the power drive unit, and may be mounted on the support arm or arms 20, 21 of the power drive unit. The grooving attachment 28 is generally spaced from the primary end 15 of the passage of the housing at a location generally along the longitudinal axis 19 of the passage such that the shaft of the grooving attachment 28 is alignable with and generally centered on the axis 19. The grooving attachment may be configured to form a groove into an exterior of the pipe through the pressure applied to the surface of the pipe between the rollers, but the groove could be formed in other ways.

The system 10 may also include a bracing device 34 for supporting and/or bracing a length of pipe mounted on the pipe machining apparatus 12 as the pipe is being machined or at least being rotated by the power drive unit. The bracing device 30 may be configured to mount on at least one of the support arms 20, 21 and may be movable with respect to the support arm to permit adjustment of the distance between portions of the bracing device 30 and the longitudinal axis 19 of the passage. The bracing device 30 may include a mounting portion 32 which is configured to mount on at least one of the support arms 20, 21 and which may be configured to receive a portion of the support arm or arms. The mounting portion 32 may be movable along at least a portion of a support arm to permit adjustment of the distance between the bracing device 30 and the primary end 15 of the passage, as well as any cutting attachment 28 mounted on the power drive unit.

The mounting portion 32 may comprise a continuous loop 34 with an interior 36 for inserting a portion of a support arm 20. The loop 34 may be formed by a mounting wall 38, and the support wall may be tubular in character in order to capture a portion of the support arm, and illustratively may be substantially cylindrical in shape which provides easy rotation of the device 30 with respect to the arms for positioning purposes. The mounting wall 38 may have an interior surface with a diameter suitable for snugly receiving a portion of the support arm while permitting a degree of sliding movability along a portion of the support arm.

The bracing device 30 may also include a support portion 40 which is configured to engage a pipe 1 gripped by the power drive unit 14. The support portion 40 may have an abutment surface 42 for abutting against a location on the pipe. The abutment surface 42 may be configured in a manner suitable to permit the pipe 1 and the abutment surface 42 to be engaged in with a degree of security, such that the support portion and the pipe may be pressed against each other and resist movement of one of the elements with respect to the other. The support portion 40 may have an open configuration to permit the abutment surface 42 to be moved into contact with a pipe in the pipe machining apparatus 12 when the mounting portion is mounted on the support arm. In some embodiments, the abutment surface may be arcuate in shape, and at least a portion of the abutment surface 42 may have a shape that generally corresponds to the outside surface diameter of a pipe mounted in the power drive unit 14. Thus, an arcuate portion of the abutment surface may have a diameter that is generally or substantially the same as the outside diameter of the pipe, and thus the size and configuration of the abutment surface may be configured for the exterior diameter of a particular pipe. Therefore, a radius of curvature of the abutment surface may be substantially equal to a radius of the outside diameter of a particular type of pipe. For example, the radius of curvature of the abutment surface may be approximately two inches to work with a four-inch diameter pipe, and the radius of curvature may be approximately three inches in order to support a six-inch outside diameter pipe. Other radii of curvature may be employed for use with other outside diameter pipe sizes.

The bracing device 30 may also include a spacing portion 44 which may extend between the mounting portion 32 and the support portion 40, and may maintain the support portion at a fixed distance from the mounting portion. The spacing portion 30 may be connected to both the mounting portion and the support portion, preferably although not necessarily in a rigid relationship that prevents movement of the support portion with respect to the mounting portion. The spacing portion suitably maintains a set or unvarying spacing and orientation between the mounting portion and the support portion, to thereby maintain spacing and orientation of a pipe 1 engaged by the support portion 40 and the support arm on which the mounting portion 32 is mounted.

Applicant has recognized that for pipes of a relatively shorter length, the grip of the machine (such as by the rollers of the groover) alone on the pipe may not be sufficient to counteract the forces (e.g., in radially inward or tangential directions) applied to the pipe at the. In such cases, the application of force by the groover attachment to the pipe may cause the pipe to deviate from a centered relationship on the groover attachment. Such movement or deviation by the pipe can cause the pipe to become damaged or the groove being formed to deviate from the desired path, as well as in a worst case scenario cause the operator to lose control of the pipe or the pipe machine apparatus and possibly become entangled in the machinery and injured. In practice, lengths of pipe as short as 4 inches have been held securely in the apparatus 12.

Advantageously, the bracing device 30 of the disclosure provides a second or an additional point of support and bracing for the pipe at a location that may be located on an opposite side of the groover attachment from the primary gripping jaws, or may even be between the attachment and the primary gripping jaws. After positioning the bracing device on the support arm at the desired location relative to the groover attachment, the operator may then position a portion of the pipe against the abutment surface 42 of the support portion which in turn is braced or supported by the spacing portion and the support portion mounted on the support arm to provide a stable bracing point for the pipe which is secured to the groover attachment (which is also mounted on one of the support arms). The pipe may rotate with respect to the abutment surface 42. The support of the bracing device 30 may be provided without the device 30 being secured in position with respect to the support arm. When not needed, the bracing device 30 may continue to be mounted on one of the support arms but may be allowed to pivot downwardly on the support arm away from the longitudinal axis 19 of the passage and away from any cutting attachment or attachments being utilized for machining operations. Optionally, the device 30 may be removed from the support arm between uses.

In illustrative embodiments, the interior of the mounting portion may have a diameter of approximately 1.25 inches, and may have a slight groove formed on the exterior surface of the loop wall to produce a slight constriction on the interior surface of the loop wall to better fit the exterior surface of the support arm. For example, the abutment surface of the support portion may have a radius of approximately 3 3/16 inches for engaging an approximately 6 inch outside diameter pipe placed in the apparatus, and may have a radius of approximately 2½ inches for engaging an approximately 4 inches outside diameter pipe. Other abutment surface radii may be used for engaging pipes of different outside diameters. The length of the spacing portion may be varied to adjust for the radius of the abutment surface and the outside diameter of the pipe to be supported, with relatively larger abutment surface radii often being associated with relatively shorter spacing portions. Generally, the distance between the center of the loop of the mounting portion to the center of curvature of the abutment surface of the support portion will be relatively uniform, since the distance between the center of the support arm 20 to the longitudinal axis 19 of the passage remains equal.

It should be appreciated that in the foregoing description and appended claims, that the terms "substantially" and "approximately," when used to modify another term, mean "for the most part" or "being largely but not wholly or completely that which is specified" by the modified term.

It should also be appreciated from the foregoing description that, except when mutually exclusive, the features of the various embodiments described herein may be combined with features of other embodiments as desired while remaining within the intended scope of the disclosure.

Further, those skilled in the art will appreciate that the steps disclosed in the text and/or the drawing figures may be altered in a variety of ways. For example, the order of the steps may be rearranged, substeps may be performed in parallel, shown steps may be omitted, or other steps may be included, etc.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

I claim:

1. A system comprising:
    a pipe machining apparatus including a support arm, a power drive unit configured to rotate a pipe to be machined, and a machining attachment mounted on the power drive unit and configured to machine the rotated pipe; and
    a bracing device for bracing a length of pipe on the pipe machining apparatus as the pipe is being machined, the bracing device comprising:
        a mounting portion configured to mount on the support arm of the pipe machining apparatus, the mounting portion being configured with a continuous loop to capture a portion of the support arm, the loop having an interior to receive the portion of the support arm, the mounting portion being pivotable with respect to the support arm when mounted on the support arm, the mounting portion being slidable along at least a portion of the support arm;
        a support portion configured to engage a pipe gripped by the pipe machining apparatus, the support portion having an abutment surface for abutting against the exterior of the pipe, the support portion having a substantially U-shaped open configuration to permit the abutment surface to be moved into contact with and embrace a portion of a pipe in the pipe machining apparatus when the mounting portion is mounted on the support arm; and
        a spacing portion extending between the mounting portion and the support portion, the spacing portion being connected to the mounting portion and the support portion to maintain the support portion at a fixed distance from the mounting portion.

2. The device of claim 1 wherein the spacing portion is rigidly mounted to the mounting portion and the support portion.

3. The device of claim 1 wherein the spacing portion is fixedly mounted to the mounting portion and support portion to maintain a uniform spacing and orientation between the mounting portion and the support portion.

4. The device of claim 1 wherein the abutment surface of the support portion is arcuate.

5. The device of claim 1 wherein the loop of the mounting portion is formed by a mounting wall, the mounting wall being substantially cylindrical.

6. The device of claim 1 wherein the spacing portion is rigidly mounted to the mounting portion and the support portion;
    wherein the spacing portion is fixedly mounted to the mounting portion and support portion to maintain a uniform spacing and orientation between the mounting portion and the support portion;
    wherein the abutment surface of the support portion is semicircular;
    wherein the mounting portion, the support portion, and the spacing portion of the bracing device are integral parts of a single piece such that all of the portions of the device pivot about the support arm when the mounting portion is pivoted about the support arm; and
    wherein the loop of the mounting portion is formed by a mounting wall, the mounting wall being substantially cylindrical.

7. The device of claim 1 wherein the abutment surface of the support portion is semicircular.

8. The device of claim 1 wherein the mounting portion, the support portion, and the spacing portion of the bracing device are integral parts of a single piece such that all of the portions of the device pivot about the support arm when the mounting portion is pivoted about the support arm.

9. A system comprising:
    a pipe machining apparatus, the pipe machining apparatus comprising:
        a power drive unit configured to rotate a pipe to be machined, the power drive unit comprising:
            a housing with a passage for receiving a length of pipe, the passage having a primary end and a secondary end, the passage having a longitudinal axis along which a pipe is supportable in the passage;
            at least one support arm mounted on the housing,
            primary gripping jaws configured to grip the pipe, the primary gripping jaws being rotatably mounted on the housing; and
        a machining attachment configured to machine a pipe, the machining attachment being mounted on the power drive unit; and
    a bracing device for bracing a length of pipe on a pipe machining apparatus as the pipe is being machined, the bracing device comprising:
        a mounting portion mounted on the support arm of the pipe machining apparatus, the mounting portion being configured with a continuous loop to capture a portion of the support arm, the loop having an interior receiving the portion of the support arm;
        a support portion configured to engage a pipe gripped by the pipe machining apparatus, the support portion having a substantially U-shaped abutment surface that abuts against and embraces a portion of the exterior of the pipe; and
        a spacing portion extending between the mounting portion and the support portion, the spacing portion being connected to the mounting portion and the support portion to maintain the support portion at a fixed distance from the mounting portion.

10. The system of claim 9 wherein the abutment surface of the support portion is arcuate.

11. The system of claim 9 wherein the loop of the mounting portion is formed by a mounting wall, the mounting wall being substantially cylindrical.

12. The system of claim 9 wherein the mounting portion is pivotable with respect to the support arm when mounted on the support arm.

13. The system of claim 9 wherein the mounting portion is slidable along at least a portion of the support arm.

14. The system of claim 9 wherein the support portion has an open configuration to permit the abutment surface to be moved into contact with a pipe in the pipe machining apparatus when the mounting portion is mounted on the support arm.

15. The system of claim 9 wherein the spacing portion is rigidly mounted to the mounting portion and the support portion.

16. The system of claim 9 wherein the spacing portion is fixedly mounted to the mounting portion and support portion to maintain a uniform spacing and orientation between the mounting portion and the support portion.

17. The system of claim 9 wherein the machining attachment is a groover attachment configured to form a groove on the pipe.

18. The system of claim 9 wherein the abutment surface of the support portion is semicircular;
- wherein the loop of the mounting portion is formed by a mounting wall, the mounting wall being substantially cylindrical;
- wherein the mounting portion is pivotable with respect to the support arm when mounted on the support arm;
- wherein the mounting portion is slidable along at least a portion of the support arm;
- wherein the support portion has an open configuration to permit the abutment surface to be moved into contact with a pipe in the pipe machining apparatus when the mounting portion is mounted on the support arm;
- wherein the spacing portion is rigidly mounted to the mounting portion and the support portion;
- wherein the mounting portion, the support portion, and the spacing portion of the bracing device are integral parts of a single piece such that all of the portions of the device pivot about the support arm when the mounting portion is pivoted about the support arm; and
- wherein the spacing portion is fixedly mounted to the mounting portion and support portion to maintain a uniform spacing and orientation between the mounting portion and the support portion.

19. The system of claim 9 wherein the abutment surface of the support portion of the bracing device is semicircular.

20. The system of claim 9 wherein the mounting portion, the support portion, and the spacing portion of the bracing device are integral parts of a single piece such that all of the portions of the device pivot about the support arm when the mounting portion is pivoted about the support arm.

* * * * *